US005237373A

United States Patent [19]

Aimoto et al.

[11] Patent Number: 5,237,373

[45] Date of Patent: Aug. 17, 1993

[54] IMAGE FORMING APPARATUS PROVIDED WITH AUTOMATIC TONER EXHAUSTING MECHANISM

[75] Inventors: Toyoka Aimoto; Yasunobu Ohkawa, both of Nara, Japan

[73] Assignee: Sharp Kabushiki Kaisha, Osaka, Japan

[21] Appl. No.: 918,496

[22] Filed: Jul. 22, 1992

[30] Foreign Application Priority Data

Jul. 29, 1991 [JP] Japan .................................. 3-188733
Apr. 28, 1992 [JP] Japan .................................. 4-110082

[51] Int. Cl.[5] ............................................ G03B 21/00

[52] U.S. Cl. .................................... 355/298; 355/208; 355/245

[58] Field of Search ............... 355/200, 260, 204, 245, 355/246, 296–298, 208

[56] References Cited

U.S. PATENT DOCUMENTS 4,325,628 4/1982 Torigai et al. .
4,436,414 3/1984 Kamiyama et al. .
4,625,895 12/1986 Tsukano .
4,629,309 12/1986 Tsukano et al. .
4,982,231 1/1991 Matsuuchi ...................... 355/298 X

FOREIGN PATENT DOCUMENTS 60-153066 8/1985 Japan .
0042285 2/1992 Japan .

*Primary Examiner*—A. T. Grimley
*Assistant Examiner*—Matthew S. Smith
*Attorney, Agent, or Firm*—David G. Conlin; George W. Neuner

[57] ABSTRACT

An image forming apparatus provides a mechanism for exhausting waste toner or developing powder and is constructed to have a sensor for sensing an amount of waste toner in a recovery vessel when the developing powder is sensed to be degraded and a determining unit for determining if the carried developing powder is overflown from the recovery vessel based on the sensed result. If it is determined that it is not overflown, the developing powder is recovered in the recovery vessel. Further, the unit for continuing the formation of an image is also provided. If the recovery vessel may provide a spared space for the waste toner after the developing powder is recovered in the recovery vessel, the formation of the image is continued.

8 Claims, 11 Drawing Sheets

IMAGE FORMING APPARATUS PROVIDED WITH AUTOMATIC TONER EXHAUSTING MECHANISM

BACKGROUND OF THE INVENTION

1. Field of the Invention

The present invention relates to an image forming apparatus of an electronic photography type such as a copying machine or a laser printer, and more particularly to an improvement of a mechanism for automatically exhausting waste developing powder to a recovery vessel.

2. Background of the Invention

The inventors of the present invention know this type of image forming apparatus which is constructed to remove the toner left on a photosensitive body by using a cleaning device and recover the waste toner into a recovery vessel. If the developing powder stored in the developing bath has two kinds of components mingled, the carrier component is degraded earlier. It is, therefore, necessary to exhaust the degraded developing powder and exchange the waste developing powder with new powder.

The inventors of the present application know three related arts about the technique for recovering the waste toner and water developing powder. These three related arts are:

Japanese Patent Lying Open No. 60-153066 (Related Art 1)

Japanese Utility Model Lying Open No. 63-180864 (Related Art 2)

File Number 03-91-3102 (Related Art 3)

For a related art 1, a leased recovery vessel is mounted to the exhaust port of a developing bath. After checking for the recovery vessel, the exchange of the developing powder is started.

Since the related art 1 needs the leased recovery vessel, however, the leased recovery vessel entails idle operations such as transportation and storage of the vessel.

For a related art 2, the residual toner on a photosensitive body is removed by a cleaning device and is recovered in a recovery vessel. The waste developing powder in the developing bath is also recovered into the same recovery vessel.

The related art 2, however, does not have means for indicating how much of waste toner is now recovered in the recovery vessel. Though the recovery vessel is full of the waste toner, the situation may appear where the exchange of the degraded developing powder with the new powder is started. In this case, the waste developing powder is not allowed to be stored in the recovery vessel, that is, the waste is overflown from the recovery vessel.

For a related art 3, in a case that the waste developing powder is not overflown as is disclosed in claim 1, the waste is allowed to be recovered. Even if it is determined that the waste is overflown, no measures are suggested.

SUMMARY OF THE INVENTION

It is an object of the present invention to provide an image forming apparatus having an automatic waste developer exhausting mechanism which is capable of smoothly recovering and exchanging developing powder according to the amount of the current recovered toner and providing a proper message from a machine side to a maintenance officer or a user in doing the service maintenance of the image forming apparatus itself.

In carrying out the object, the image forming apparatus according to a first aspect of the present invention provides a mechanism for exhausting automatic toner and developing powder and includes: a developing bath for developing an electrostatic latent image on a photosensitive body; a cleaning unit for cleaning residual toner on a photosensitive body; a recovery vessel for recovering waste toner from the cleaning unit and degraded developing powder in the developing bath; means for carrying developing powder from the developing powder to the recovery vesssel; means for sensing a degrading time of the developing powder; means for sensing an amount of waste toner in the recovery vessel when the sensing means senses the developing powder is degraded; means for determining if the carried developing powder is overflown from the recovery vessel according to the sensed result of the sensing means and a value set in means for storing an amount of waste developing powder; and means for outputting a recovery signal to the waste developing powder carrying means only if it is determined that the carried developing powder is not overflown from the recovery vessel according to the determined result of the determining means.

The image forming apparatus according to a second aspect of the present invention provides a waste toner and developing powder exhausting mechanism and includes: a developing bath for developing an electrostatic latent image on a photosensitive body; a cleaning unit for cleaning residual toner on a photosensitive body; a recovery vessel for recovering waste toner from the cleaning unit and degraded developing powder in the developing bath; means for carrying developing powder from the developing powder to the recovery vessel; means for sensing a degrading time of the developing powder; means for sensing an amount of waste toner in the recovery vessel when the sensing means senses the developing powder is degraded; means for determining if the amount given when the developing powder is exhausted reaches the amount in which the vessel needs to be exchanged according to the sensed result of the means for sensing the amount of waste toner and a value set in means for storing an amount of waste developing powder; and means for delaying the recovery of the waste developing powder and continuing the formation of an image when the determined results does not indicate when the vessel needs to be exchanged.

The image forming apparatus according to a third aspect of the present invention provides a waste toner and developing powder exhausting mechanism and includes: a developing bath for developing an electrostatic latent image on a photosensitive body; a cleaning unit for cleaning residual toner on a photosensitive body; a recovery vessel for recovering waste toner from the cleaning unit and degraded developing powder in the developing bath; means for carrying developing powder from the developing powder to the recovery vessel; means for sensing a degrading time of the developing powder; means for sensing an amount of waste toner in the recovery vessel when the sensing means senses the developing powder is degraded; means for determining if the carried developing powder is overflown from the recovery vessel according to the sensed result of the means for sensing the amount of waste toner and a value set in means for storing an amount of waste developing powder; means for counting a number of image-formed papers, based on a degrading signal sent from the means for sensing the degraded time; and means for continuing the formation of an image if counting means indicates a set value or less and the volume in the recovery vessel is left after the developing powder is recovered.

The image forming apparatus according to a fourth aspect of the present invention provides a waste toner and developing powder exhausting mechanism and includes: a developing bath for developing an electrostatic latent image on a photosensitive body; a cleaning unit for cleaning residual toner on a photosensitive body; a recovery vessel for recovering waste toner from the cleaning unit and degraded developing powder in the developing bath; means for carrying developing powder from the developing powder to the recovery vessel; means for sensing a degrading time of the developing powder; means for sensing an amount of waste toner in the recovery vessel; first level determining means for determining if the sensed result of the sensing means reaches the reference amount of the waste toner; second level determining means for determining if the sensed result of the sensing means reaches the amount in which the vessel needs to be exchanged; means for continuing the formation of an image if the determined result of the first level determining means reaches a reference amount of the waste toner but the sensed result of the means for sensing the degrading time of the developing powder does not indicate the degrading time; means for outputting a recovery signal to the means for carrying the waste developing powder when the means for sensing the degrading time of the developing powder senses the developing powder is degraded; and displaying means for prompting the recovery vessel to be exchanged when the determined result of the second level determining means reaches the volume in which the vessel needs to be exchanged.

In operation, the mechanism according to the first aspect of the invention is constructed to sense the carried waste developing powder and, if it is overflown from the recovery vessel, inhibit the overflow of the waste developing powder from the recovery vessel.

The mechanism according to the second aspect of the invention is constructed to exchange the developing powder when the recovery vessel is full of the waste without exhausting the waste developing powder if the waste in the recovery vessel is smaller than the reference amount at the time of exchanging the developing powder. This construction makes it possible to reduce the overall troublesome operation. Hence, the copying operation is allowed to be continued until the waste toner in the recovery vessel reaches the reference amount even if the developing powder enters into the exchange time.

The mechanism according to the third aspect of the invention is allowed to set such a number of copies as keeping the exchange period to a proper value. This results in preventing the quality of copies from being lowered.

The mechanism according to the fourth aspect of the invention is constructed to carry the degraded developing powder to the recovery vessel. In general, the number of copies is on the order of several thousands to several ten thousands. It means that the exchange of the developing powder is not carried out several times during the life of the machine itself. When the toner reaches the first level, therefore, the life data of the developing powder is checked. If the life of the developing powder is left, the toner is allowed to be carried to the second level and the copying operation is enabled. This results in reducing the exchange frequency of the recovery vessel.

Further objects and advantages of the present invention will be apparent from the following description of the preferred embodiments of the invention as illustrated in the accompanying drawings.

DESCRIPTION OF THE PREFERRED EMBODIMENTS

Figure 1:
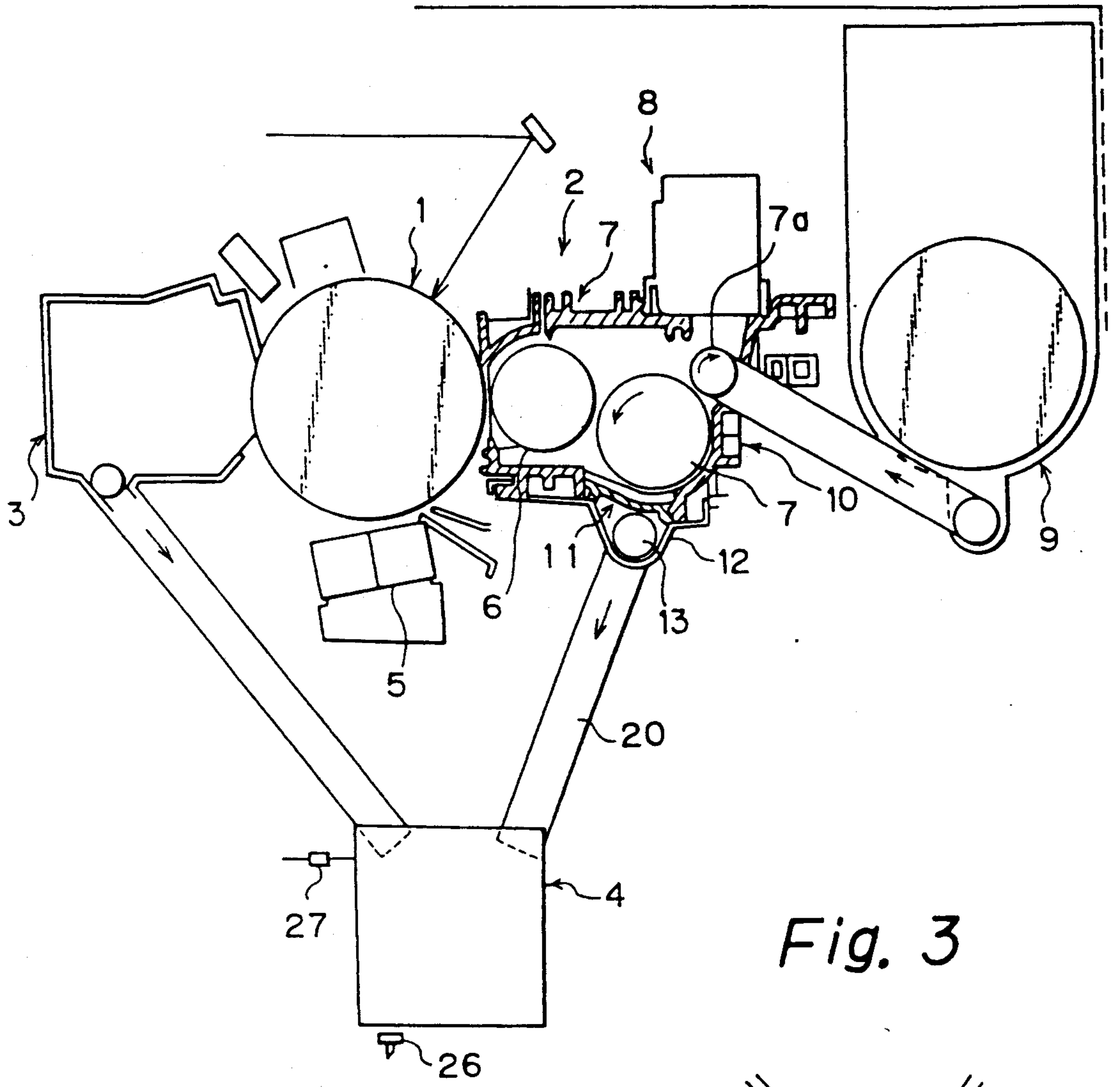
FIG. 1 is a view showing a construction of an image forming apparatus according to a first embodiment of the present invention.
Figure 3:
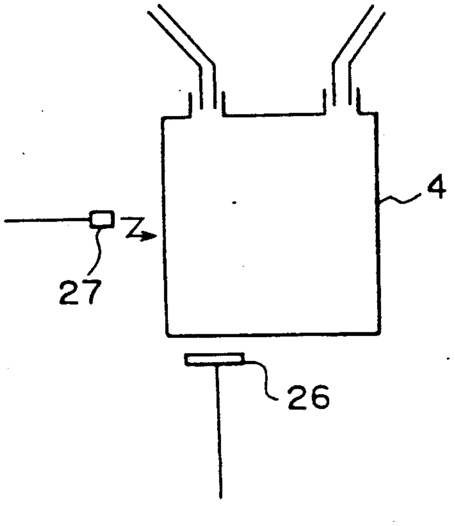
FIG. 3 is a view showing a recovery vessel included in the image forming apparatus.
Figure 2:
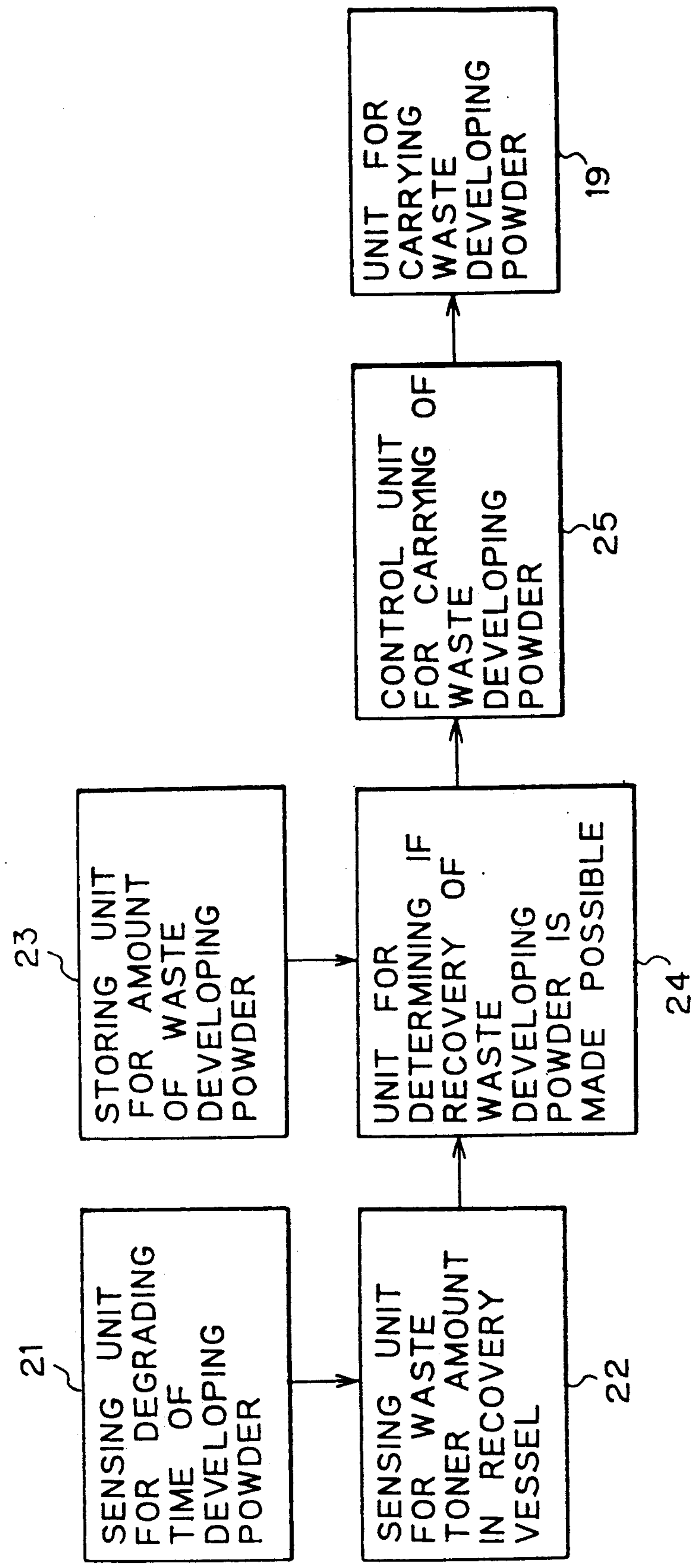
FIG. 2 is a function block diagram showing an image forming apparatus according to the first embodiment.
Figure 4:
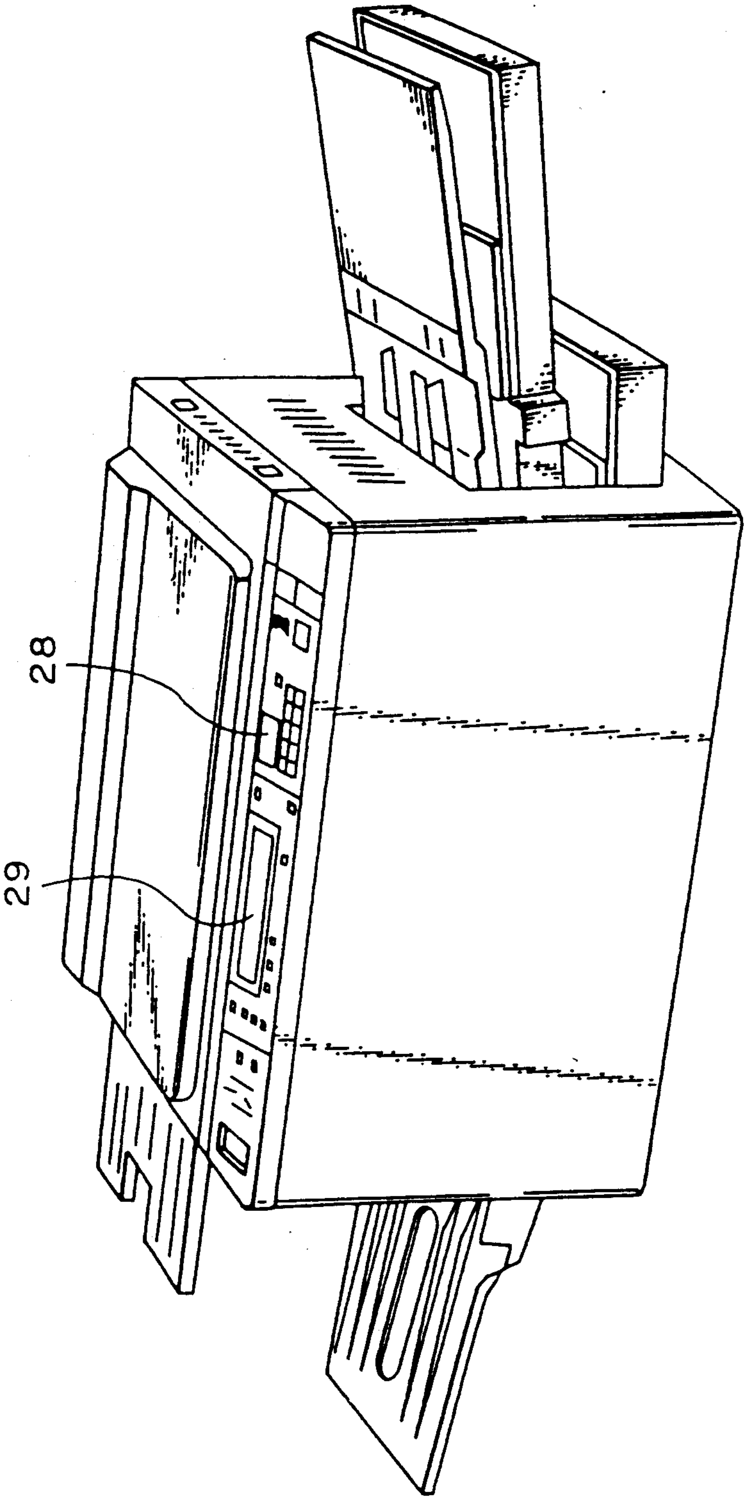
FIG. 4 is a view showing an operation panel provided in the image forming apparatus.
Figure 5:
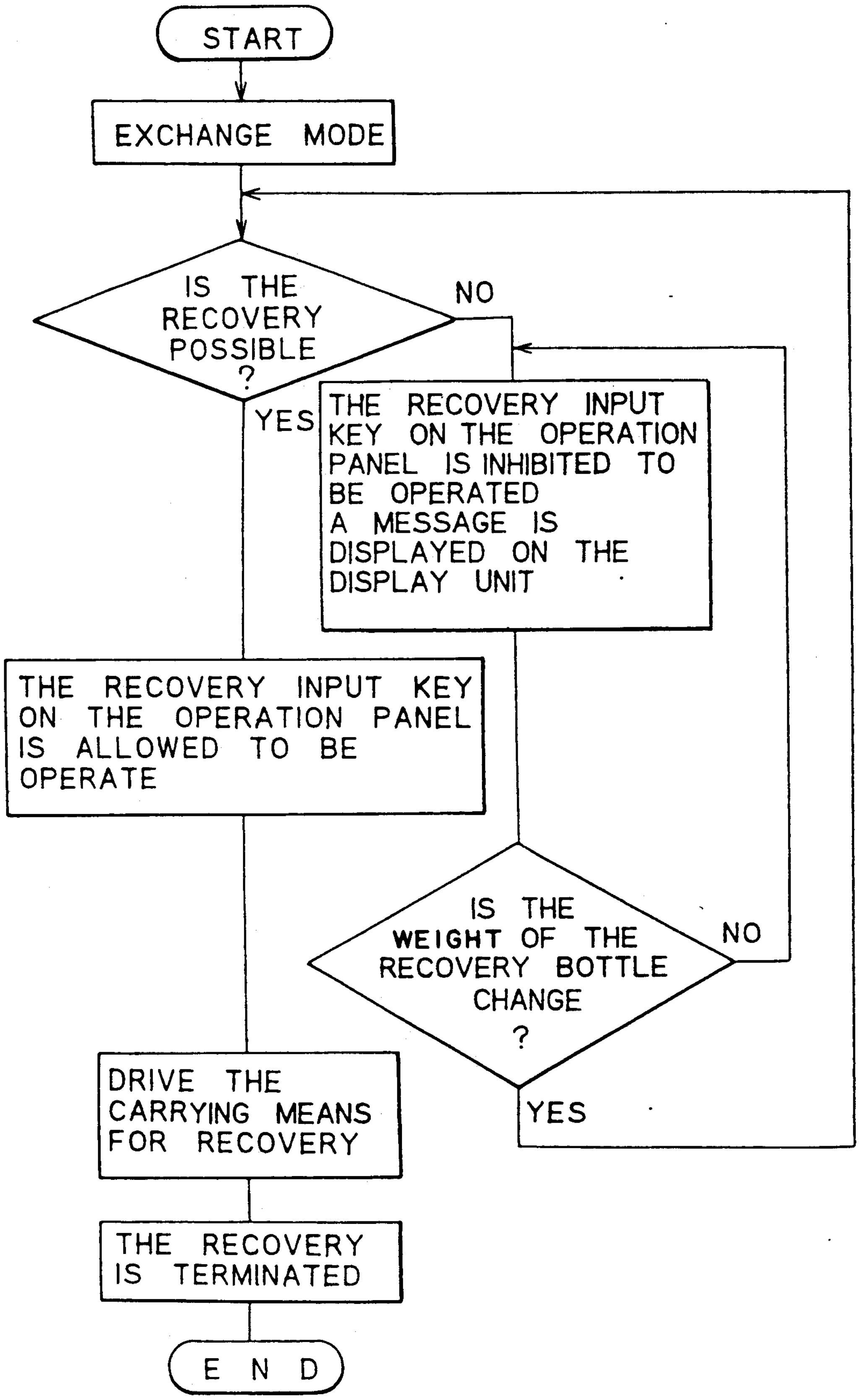
FIG. 5 is a flowchart showing an operation of the image forming apparatus.

FIG. 1 is a view showing the image forming apparatus according to a first embodiment of the present invention. FIG. 2 is a function block diagram showing an image forming apparatus according to the first embodiment. FIG. 3 is a view showing a recovery vessel included in the image forming apparatus shown in FIG. 2. FIG. 4 shows a keyboard and a display unit on an operation panel. FIG. 5 is a flowchart showing the recovering operation executed in the image forming apparatus.

As shown in FIG. 1, a numeral 1 denotes a photosensitive body. A numeral 2 denotes a developing bath for developing an electrostatic latent image formed on the photosensitive body 1. A numeral 3 denotes a cleaning unit for cleaning the residual toner left on the photosensitive body 1. A numeral 4 denotes a recovery vessel for recovering the waste toner from the cleaning unit 3 and the degraded developing powder in the developing bath 3.

The photosensitive body 1 is formed like a drum. The developing bath 2, a transcriber 5 and the cleaning unit 3 are located around the photosensitive body 1.

The developing bath 2 provides a developing roller 6 and stirring rollers 7, 7*a* fitted therein. On the top of the developing bath 2 are provided a toner feeding bath 8 and a developing powder feeding bath 9. In response to a signal sent from a toner density sensor 10, the toner is fed from the toner feeding bath 8. In response to a developing powder exchange signal, the developing powder is fed from the developing powder feeding bath 9.

On the bottom of the developing bath 2 is provided a shutter 11 for exhausting or discharging the developing powder. Under the shutter 11, a bed plate 12 of the developing bath is located. The bed plate 12 serves as a carrying screw wall. The bed plate 12 provides the carrying screw 13 for exhausting the waste developing powder in itself. A waste developing powder carrying means (see FIG. 2) is composed of the screw 13 and a recovery pipe 20 connecting the developing bath 2 to the recovery vessel 4.

In the recovery vessel 4, the waste toner is carried from the cleaning unit 3. When the developing powder needs to be exchanged, the waste developing powder is exhausted into the recovery vessel 4 by means of the screw 13.

To exhaust the degraded developing powder in the developing bath, the shutter 11 is pulled to the side of a user through the effect of a rack and a pinion. The shutter 11 has the right and the left ends formed like a hook and is fitted to the developing bath along the longer side of the developing bath 2. By pulling the shutter 11, the developing powder is dropped from an opening of the developing bath 2 into the space above the screw 13 and the bed plate 12.

The rollers 6, 7, 7*a* and the screw 13 are driven so that the developing powder in the developing bath 2 may be guided into the recovery vessel 4. After recovering the developing powder, the shutter 11 is returned to an original state. Then, the new developing powder is fed from the feeding bath 9 and the exchange of the developing powder is terminated.

According to this embodiment, as shown in FIG. 2, the foregoing recovery mechanism is constructed to have a unit 19 for carrying waste developing powder, a unit 21 for sensing a degrading time of developing powder, a unit 22 for sensing a waste toner amount in the recovery vessel 4 when the developing powder is sensed to be degraded, a unit 23 for storing an amount of waste developing powder, a unit 24 for determining whether or not the carried developing powder is overflown from the recovery vessel 4, based on the sensed result of the waste toner amount sensing unit 22 and the set value of the storing unit 23, and a unit 25 for outputting a recovery indication signal to the waste developing powder carrying unit 19 if the determining unit 24 determines that the carried developing powder is not overflown.

As shown in FIG. 4, the image forming apparatus (herein, a copying machine) provides the keyboard 28 and the display unit 29 on the operation panel for inputting a recovery indicating signal to the developing powder carrying unit 19 in accordance with the determined result of the unit 24. Further, the control unit 25 is provided in the image forming apparatus.

Turning to FIG. 2, the sensing unit 21 for sensing the degrading time of the developing powder is composed of a counter for counting a number of copies and outputting a signal when the counted value reaches a predetermined value.

The unit 22 for sensing the waste toner amount is composed of a weight sensor 26 located under the recovery vessel 4 and an optical sensor 27 located on the side of the recovery vessel 4 as shown in FIG. 3.

The unit 24 for determining whether or not the waste developing powder is recovered and the unit 25 for controlling the carry are composed of a CPU, a program ROM and a data RAM loaded in a one-chip microcomputer.

In the foregoing arrangement, as referring to FIGS. 2 and 5, when the number of copies reaches a predetermined one, the sensing unit 21 determines that the developing powder is degraded. Then, the operation of exchanging the developing powder is started. When exhausting the developing powder, through the effect of the weight sensor or the optical sensor of the waste toner amount sensing unit 22, the waste toner amount in the recovery vessel 4 is sensed. Next, the determining unit 24 determines whether or not the addition of the sensed waste toner amount in the recovery vessel 4 and the amount of the pre-stored developing powder in the developing bath 2 exceeds the left volume of the recovery vessel 4. If it is determined that the carried developing powder is not overflown from the recovery vessel 4, the control unit 25 serves to drive the screw 13 and the shutter 11 of the carrying unit 19. If it is overflown, the waste developing powder is not allowed to be exhausted.

For driving the screw 13 and the shutter 11, the key 28 on the operation panel is allowed to be operated. If the determining unit 24 determines that the waste developing powder is overflown, the key 28 is disallowed to be operated for inhibiting the driving of the elements of the carrying unit through the effect of the carrying control unit 25. At a time, the display unit 29 on the operation panel indicates a message "Exchange a recovery bottle".

When a maintenance officer replaces the recovery bottle with an empty one or a bottle with a smaller amount of the waste toner amount, the amount sensing unit 22 and the recovery determining unit 24 determine whether or not the waste developing powder is overflown from the recovery bottle. If not, the key 28 on the operation panel is allowed to be operated.

The waste toner amount sensing unit 22 is not limited to the weight sensor 26 and the optical sensor 27. Any means may be used if it enables to make sure of the amount of the waste toner.

Figure 6:
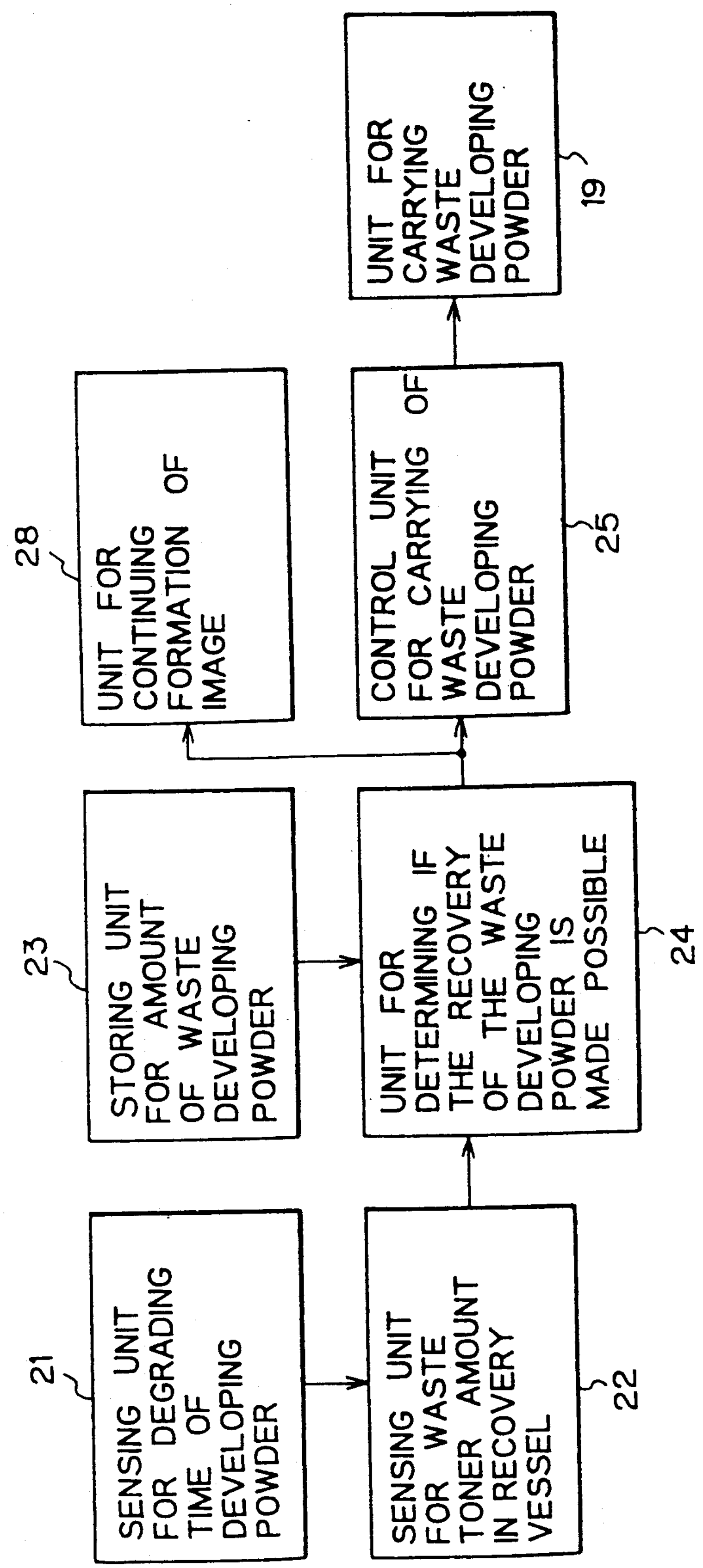
FIG. 6 is a function block diagram showing an image forming apparatus according to a second embodiment of the present invention.
Figure 7:
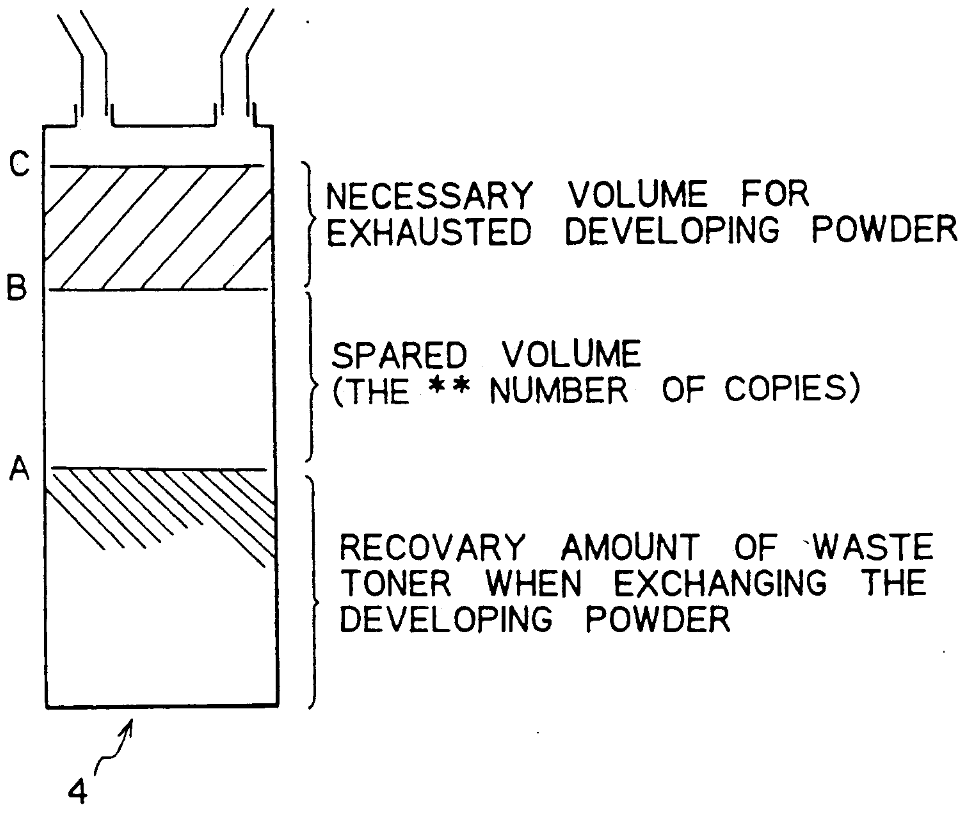
FIG. 7 is a view showing amounts of toner and developing powder in a recovery vessel included in the image forming apparatus shown in FIG. 6.

In turn, the description will be directed to a second embodiment of the present invention as referring to FIGS. 6 and 7, in which FIG. 6 is a function block diagram showing an image forming apparatus according to the second embodiment and FIG. 7 shows an amount of toner and developing powder in a recovery vessel.

In the image forming apparatus according to this embodiment, as shown in FIG. 6, a waste developer exhausting mechanism is provided to have a unit 19 for carrying waste developing powder, a unit 21 for sensing a degrading time of developing powder, a unit for sensing a waste toner amount in the recovery vessel 4 when the degrading time of the developing powder is sensed, a unit 24 for determining whether or not the exhausted amount of the developing powder reaches the amount of the vessel exchanging time, a unit 28 for delaying the recovery of the waste developing powder and continuing the formation of the image if the determined result indicates the vessel should not be exchanged, and a unit 25 for outputting a recovery signal to the carrying unit 19. To control those units, a microcomputer is used. The other components and relation among them of this embodiment are the same as those of the first embodiment.

In the above construction, assume that the waste toner amount in the recovery vessel 4 is at the A level (see FIG. 7) at the exchanging time of the developing powder. If the necessary amount of the developing powder to be exhausted to the recovery vessel 4 is C−B, the spared space of (B−A) is left in the recovery vessel 4. To reduce the overall troublesome operation, it is better to exchange the recovery vessel when it is filled rather than to exchange it when the spared space is left.

According to this embodiment, therefore, at the exchanging time of the developing powder, the copying operation is allowed to be continued until the waste toner level in the recovery vessel 4 reaches B.

To sense the level B, any kind of sensors such as a weight sensor and an optical sensor may be used.

When the waste toner level reaches B, the waste developing powder is exchanged. This results in reducing the troublesome operation of the user or the maintenance officer.

Figure 8:
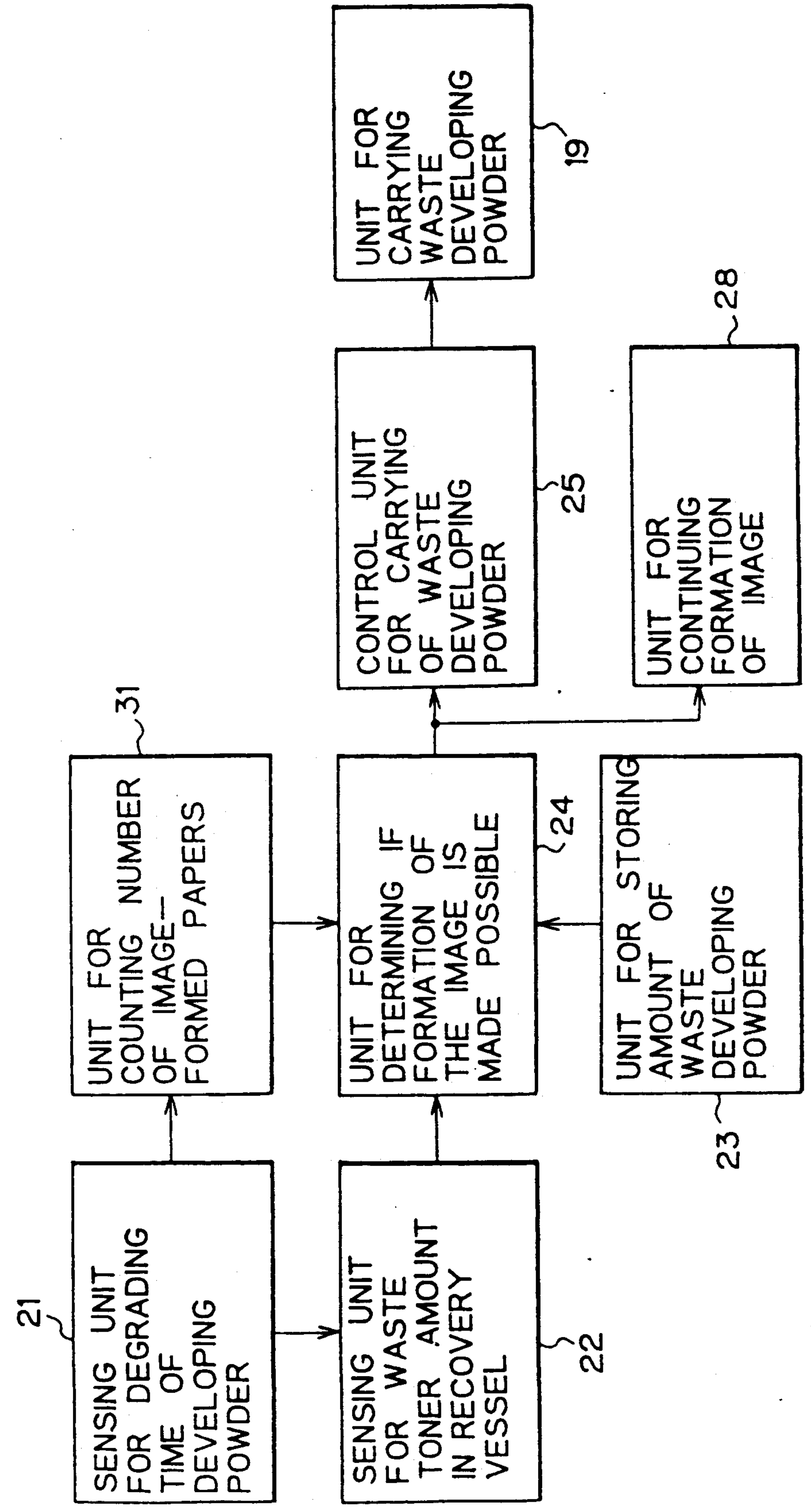
FIG. 8 is a function block diagram showing an image forming apparatus according to a third embodiment of the present invention.
Figure 9:
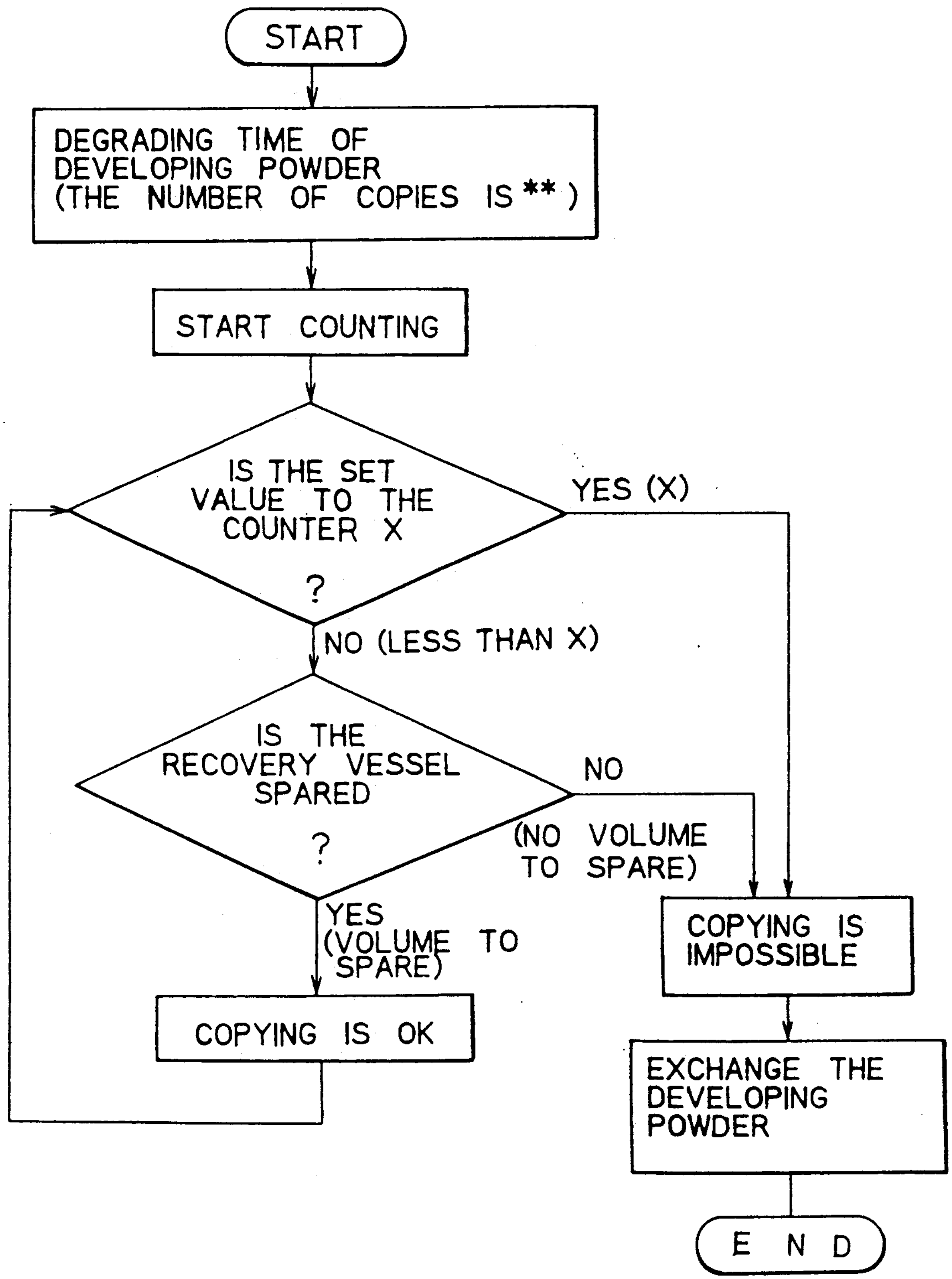
FIG. 9 is a flowchart showing the controlling operation of the image forming apparatus shown in FIG. 8.

In turn, the description will be directed to a third embodiment of the present invention as referring to FIGS. 8 and 9, in which FIG. 8 is a functional block diagram showing an image forming apparatus according to the third embodiment and FIG. 9 is a flowchart showing the control of the image forming apparatus.

In the image forming apparatus according to this embodiment, as shown in FIG. 8, a waste developer exhausting mechanism is provided to have a unit 21 for sensing when the developing powder is degraded, a unit 22 for sensing an amount of waste toner in the recovery vessel 4 when the sensing unit 21 senses the developing powder is degraded, a unit 23 for storing a predetermined amount of waste developing powder, a unit 24 for determining whether or not the carried developing powder is overflown from the recovery vessel 4 according to the sensed result of the sensing unit 22 and the set value of the storing unit 23, a unit 31 for counting a number of copies based on a degrading signal from the sensing unit 21, and a unit 28 for continuing the formation of an image only if the counted result of the counting unit 31 is equal to the set value or less and the recovery vessel 4 leaves a spared volume after the waste developing powder is recovered. The other components and relation among them of this embodiment are the same as those of the first embodiment.

Then, the flow of the copying operation will be described as referring to FIG. 9.

A copying operation is started. Assuming that the  copies are set as around a time when the developing powder is degraded, a counter in the machine itself is started when the number of processed copies reach . To set the time when the developing powder is degraded, it is possible to use not only the number of copies but the number of revolutions counted since the rollers are started.

Then, the number of allowable quality-kept copies counted from the ** is set as x to the counter.

If the counter indicates x or less and the recovery vessel 4 leaves the spared space after the developing powder is recovered into the vessel 4 at this time. the copying operation is OK. If no spared space is left, the copying operation is not allowed. Then, the developing powder is exchanged.

If the recovery vessel 4 leaves the spared space, when the counter reaches a value of x, the copying operation is stopped. At a time, the exchange of the developing powder is started.

By setting the counter so that the exchange time of the developing time does not exceed a certain limit, it is possible to keep the proper quality of copies.

Figure 10:
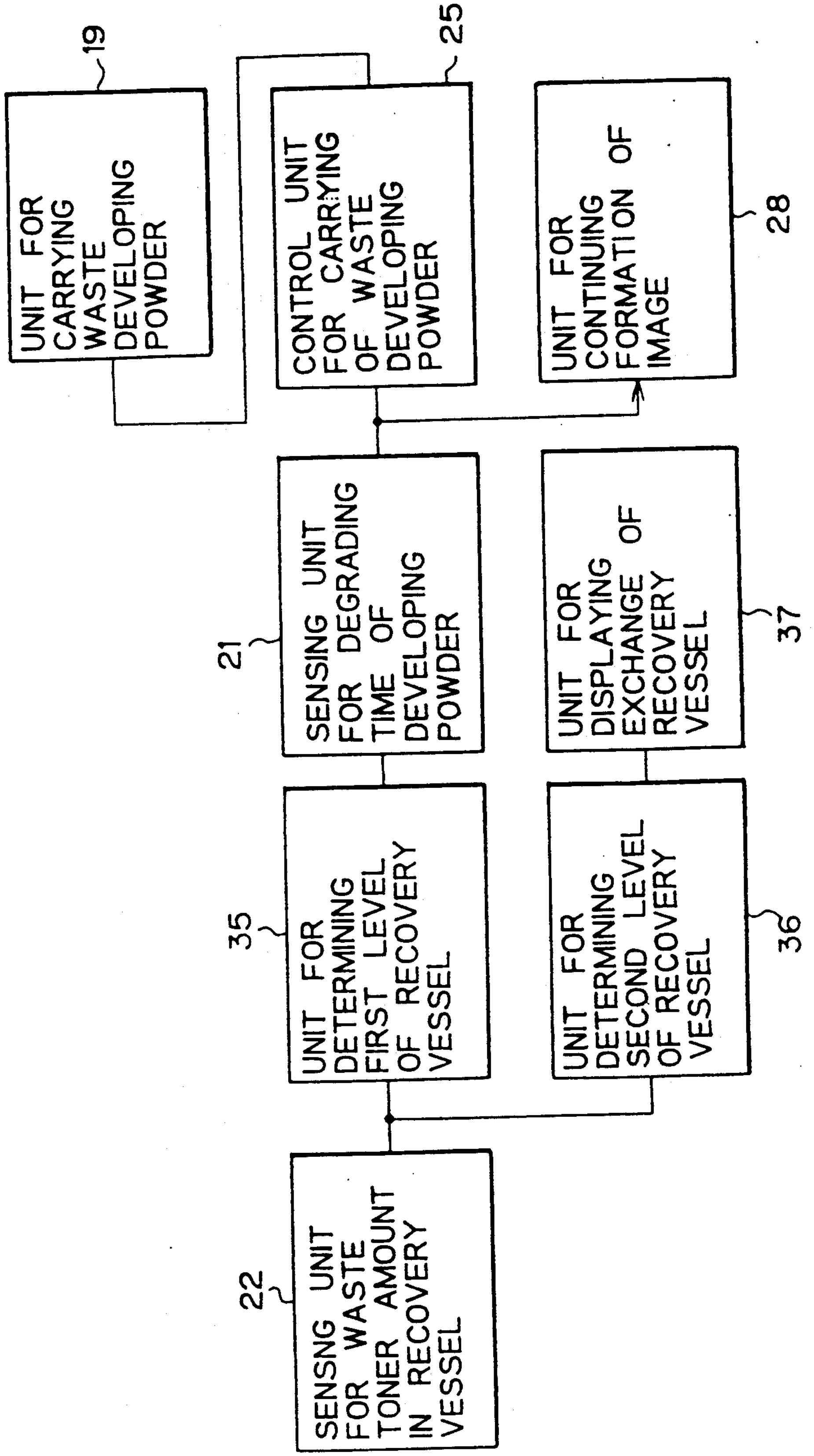
FIG. 10 is a function block diagram showing an image forming apparatus according to a fourth embodiment of the present invention.
Figure 11:
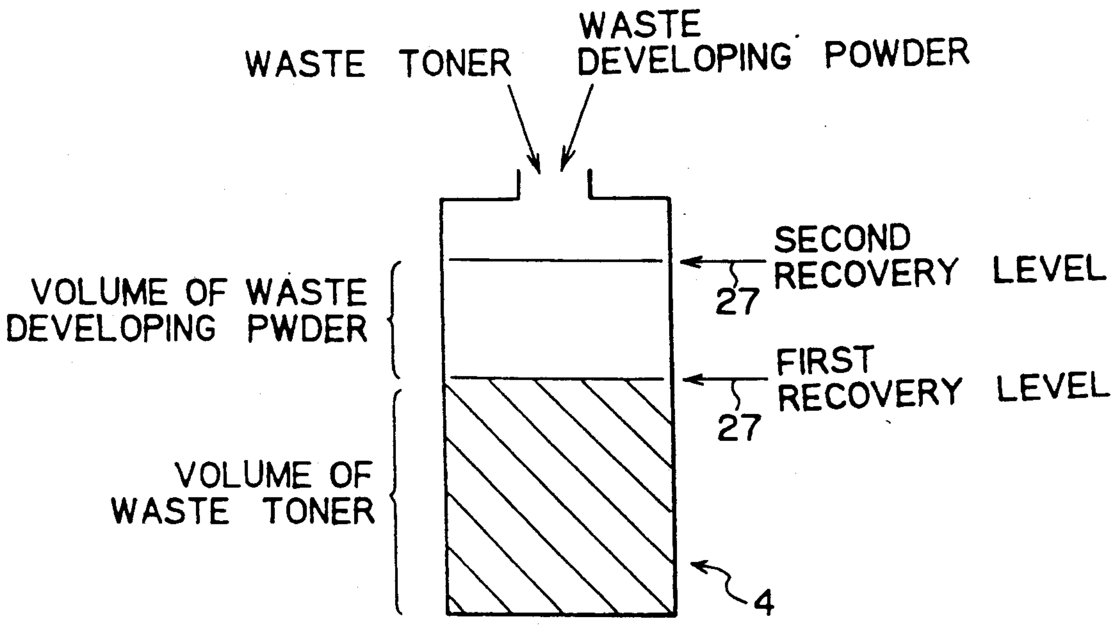
FIG. 11 is a view showing a relation between waste toner and developing powder in a recovery vessel included in the image forming apparatus.
Figure 12:
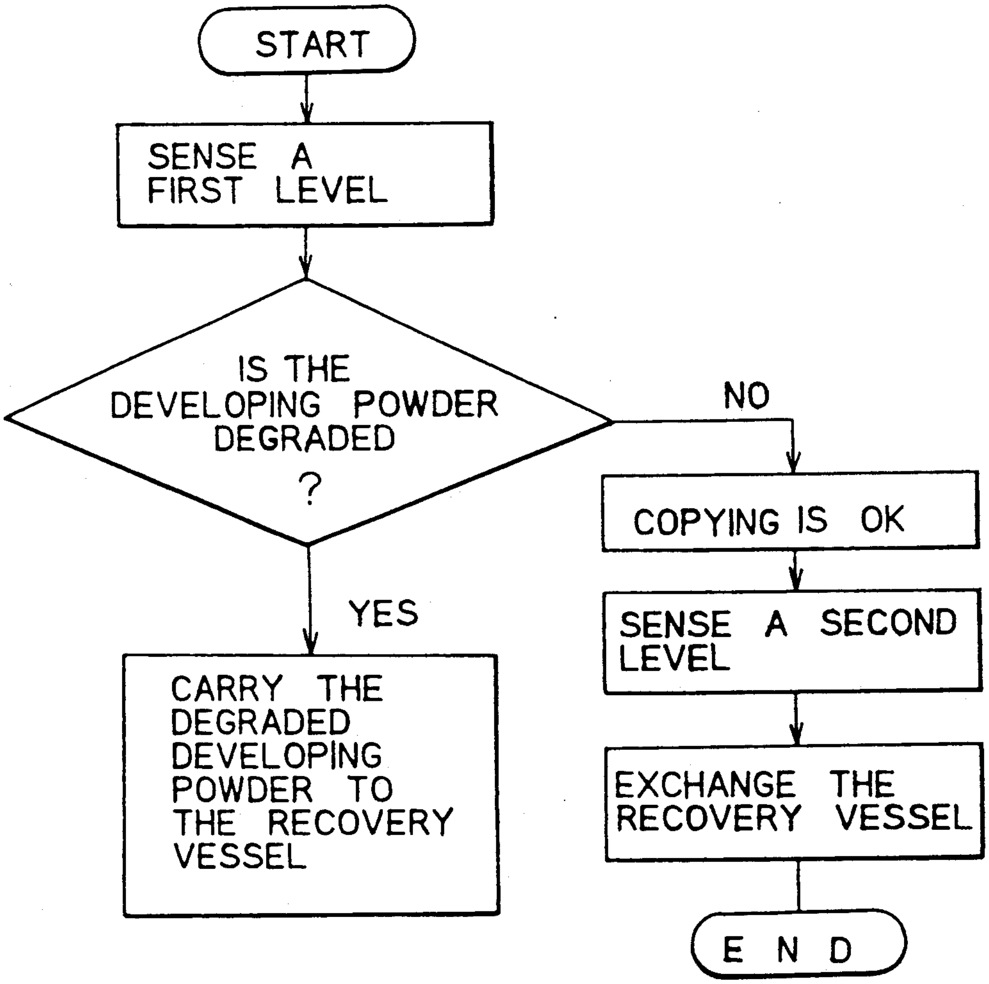
FIG. 12 is a flowchart showing the controlling operation of the image forming apparatus.

In turn, the description will be directed to a fourth embodiment of the present invention as referring to FIGS. 10, 11, and 11, in which FIG. 10 is a functional block diagram showing an image forming apparatus according to the fourth embodiment, FIG. 11 is a view showing a relation between an amount of waste toner and an amount of developing powder in a recovery vessel, and FIG. 12 is a flowchart showing the control of the image forming apparatus.

As shown in FIG. 10, the recovery mechanism included in this embodiment is provided to have a unit 22 for sensing an amount of waste toner, a first level determining unit 35 for determining whether or not the sensed result of the sensing unit 22 reaches a reference amount of the waste toner, a second level determining unit 36 for determining whether or not the sensed result of the sensing unit 22 reaches the amount in which the vessel needs to be exchanged, a unit 28 for continuing the formation of an image if the determined result of the first level determining unit 35 reaches the reference volume of the waste toner but the sensed result of the sensing unit 21 is not allowed to reach the degrading time, a unit 25 for outputting a recovery signal to the waste developing powder carrying unit 19 when the sensing unit 21 senses the developing powder is degraded, and a display unit 37 for prompting the recovery vessel 4 to be exchanged when the determined result of the second level determining unit 36 reaches the amount in which the vessel needs to be exchanged.

The first level means an amount in which maximum storage of the waste toner is allowed. The second level means an amount between the amount of the first level and the full amount of the recovery vessel. The other components and relations among them are the same as those of the first embodiment.

In the foregoing arrangment, when the developing powder needs to be exchanged, it is carried into the recovery vessel 4. In general, however, the exchange of the developing powder corresponds to about several thousands to several ten thousands copies. When the toner reaches the first level, therefore, the life data of the developing powder is checked. If the life of the developing powder is still left, the toner is allowed to be carried into the second level. Then, the copying operation is allowed.

The life data of the devéloping powder may be the number of copies (counter values), the image density, the rotating time of the rollers in the developing bath, and so forth. By setting the first recovery level for the maximum storage of the waste toner and the second recovery level for the storage of the degraded developing powder on the waste toner storage, therefore, it is possible to make the most use of the recovery vessel 4 and reduce the exchanging frequency of the recovery vessel 4.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image forming apparatus comprising:
- a developing bath for developing an electrostatic latent image on a photosensitive body;
- a cleaning unit for cleaning residual toner on said photosensitive body;
- a recovery vessel for recovering waste toner from said cleaning unit and degraded developing powder in said developing bath;
- a means for carrying the developing powder from said developing bath into said recovery vessel;
- a first means for sensing a degrading time of said developing powder;
- a second means for sensing an amount of the waste toner in said recovery vessel when said first means senses the degrading time of the developing powder;
- means for storing a value corresponding to an amount of the developing powder in said developing bath;
- means for determining whether the developing powder is overflowing from said recovery vessel on carrying of the developing powder by said carrying means or not based on the sensed result of said second means and a value stored in said storing means; and
- means for controlling said carrying means so as to cause said carrying means to carry the developing powder into said recovery vessel only in a case where the developing powder is not overflowing from said recovery vessel on carrying of the developing powder by said carrying means in response to the determined result of said determining means and to inhibit driving of said carrying means when the determined result of said determining means indicates that the developing powder is overflowing from said recovery vessel.

2. An image forming apparatus as claimed in claim 1, wherein said first means comprises a counter.

3. An image forming apparatus as claimed in claim 1, wherein said second means comprises a weight sensor or an optical sensor.

4. An image forming apparatus as claimed in claim 1, wherein said determining means and said controlling means are composed of a one-chip microcomputer having a CPU, a program ROM and a data RAM.

5. An image forming apparatus comprising:
- a developing bath for developing an electrostatic latent image on a photosensitive body;
- a cleaning unit for cleaning residual toner on said photosensitive body;
- a recovery vessel for recovering waste toner from said cleaning unit and degraded developing powder in said developing bath;
- means for carrying the developing powder from said developing bath into said recovery vessel;
- a first means for sensing a degrading time of said developing powder;
- a second means for sensing an amount of the waste toner in said recovery vessel when said first means senses the degrading time of the developing powder;
- means for storing a value corresponding to an amount of the developing powder in said developing bath;
- means for determining whether the amount of the waste toner reaches a predetermined amount in which said recovery vessel needs to be exchanged or not based on the sensed result of said second means and a value stored in said storing means;
- means for controlling said carrying means so as to inhibit driving of said carrying means when the determined result of said determining means indicates that the amount of the waste toner reaches said predetermined amount; and
- means for continuing the image information by delaying exchanging of said recovery vessel when the determined result of said determining means does not indicate that said recovery vessel needs to be exchanged.

6. An image forming apparatus as claimed in claim 5, wherein said second means comprises a weight sensor or an optical sensor.

7. An imaging forming apparatus comprising:
- a developing bath for developing an electrostatic latent image on a photosensitive body;
- a cleaning unit for cleaning residual toner on said photosensitive body;
- a recovery vessel for recovering waste toner from said cleaning unit and degraded developing powder in said developing bath;
- means for carrying the developing powder from said developing bath into said recovery vessel;
- a first means for sensing a degrading time of said developing powder;
- a second means for sensing an amount of the waste toner in said recovery vessel when said first means senses the degrading time of the developing powder;
- means for storing a value corresponding to an amount of the developing powder in said developing bath;
- means for determing whether the developing powder is overflowing from said recovery vessel on said carrying means or not based on the sensed result of said second means and a value stored in said storing means;
- means for counting a number of image-formed papers based on the sensed result of said first means;
- means for controlling said carrying means so as to inhibit driving of said carrying means when the determined result of said determining means indicates that the developing powder is overflowing said recovery vessel; and
- means for continuing the image information when the counted result of said counting means does not reach a predetermined number and the sensed result of said second means does not reach a predetermined amount.

8. An image forming apparatus comprising:
- a developing bath for developing an electrostatic latent image on a photosensitive body;
- a cleaning unit for cleaning residual toner on said photosensitive body;
- a recovery vessel for recovering waste toner from said cleaning unit and degraded developing powder in said developing bath;
- means for carrying the developing powder from said developing bath into said recovery vessel;
- a first means for sensing a degrading time of said developing powder;
- a second means for sensing an amount of the waste toner in said recovery vessel;
- means for storing a value corresponding to an amount of the developing powder in said developing bath;
- a first level determining means for determining whether the amount of the waste toner sensed by said second means reaches the reference amount of the waste toner or not;

a second level determining means for determining whether the amount of the waste toner sensed by said second means reaches a predetermined amount in which said recovery vessel needs to be exchanged or not;

means for continuing the image information when the sensed result of said first means does not indicate the degrading time even if the determined result of said first level determining means indicates that the amount of the waste toner reaches the reference amount;

means for controlling said carrying means so as to cause said carrying means to carry the degraded developing powder into said recovery vessel when said first means senses the degrading time of the developing powder and to inhibit driving of said carrying means when the determined result of said second level determining means indicates that the amount of the waste toner reaches said predetermined amount; and a displaying means for displaying the exchanging of said recovery vessel when the determined result of said second level determining means indicates that the amount of the waste toner reaches said predetermined amount.

* * * * *